United States Patent
Eldery et al.

(10) Patent No.: US 7,571,072 B2
(45) Date of Patent: Aug. 4, 2009

(54) ENERGY BASED POSITION AND SPEED SELF-SENSING METHOD AND APPARATUS FOR SYNCHRONOUS MACHINE

(75) Inventors: Mohamed A. Eldery, Mississauga (CA); Cristian E. Anghel, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 29 days.

(21) Appl. No.: 11/772,439

(22) Filed: Jul. 2, 2007

(65) Prior Publication Data

US 2009/0012742 A1    Jan. 8, 2009

(51) Int. Cl.
*G01B 7/30* (2006.01)
(52) U.S. Cl. .......... 702/151; 318/479; 318/504
(58) Field of Classification Search .......... 702/151; 318/700, 701, 712, 715, 716, 400.23, 400.37, 318/400.4, 479, 504; 322/10
See application file for complete search history.

(56) References Cited

U.S. PATENT DOCUMENTS

| | | | | |
|---|---|---|---|---|
| 5,363,032 A | * | 11/1994 | Hanson et al. | 322/10 |
| 5,430,362 A | * | 7/1995 | Carr et al. | 318/779 |
| 5,594,322 A | * | 1/1997 | Rozman et al. | 322/10 |
| 6,809,496 B2 | | 10/2004 | Anghel et al. | |
| 7,034,497 B2 | | 4/2006 | Markunas et al. | |
| 7,045,986 B2 | | 5/2006 | Anghel et al. | |
| 2005/0007044 A1 | | 1/2005 | Qiu et al. | |

FOREIGN PATENT DOCUMENTS

| | | |
|---|---|---|
| EP | 1 736 736 | 12/2006 |
| WO | WO2006017306 | 2/2006 |

\* cited by examiner

*Primary Examiner*—Drew A Dunn
*Assistant Examiner*—Hien X Vo
(74) *Attorney, Agent, or Firm*—Oral Caglar, Esq.

(57) ABSTRACT

An envelope of a voltage may be extracted using an operator to calculate a position and speed of a rotor. A position and speed sensing method may include supplying voltage to a stator, coupling the voltage into a rotor, extracting an envelope of the voltage using an operator, and calculating a rotor angular position based on the extracted envelope. A position and speed sensing apparatus may include a stator, a rotor and a controller to extract an envelope of a voltage coupled through the rotor into the stator using an operator and to calculate a rotor angular position based on the extracted envelope.

17 Claims, 6 Drawing Sheets

ENERGY BASED POSITION AND SPEED SELF-SENSING METHOD AND APPARATUS FOR SYNCHRONOUS MACHINE

BACKGROUND OF THE INVENTION

The present invention relates generally to engine starters and generators, and more particularly to sensorless engine starter/generators.

In order to effectively start an aerospace or similar engine, constant or almost constant torque may be necessary. In order for a starter/generator to deliver this constant or almost constant torque, rotor position and speed sensing and processing may be required. Conventionally, sensors connected to a control unit are used to process rotor position and rotor speed information to create constant or almost constant torque during a start mode. These sensors may be located at a distance from the control unit, requiring undesirable additional connections and additional wiring between the sensors of a starter/generator and a control unit.

Sensorless sensing and processing of rotor position and rotor speed is an advancement over starter/generators requiring sensors. U.S. Pat. No. 6,809,496 describes a position sensor emulator providing sensorless sensing and processing of rotor position. The method of the position sensor emulator is based on supplying field windings of a starter/generator with constant or variable frequency AC voltage. A signal conditioning board may be used to extract two quadrature components using bandpass filters. Additionally, the position sensor emulator may provide a rectifier that rectifies exciter voltage signals of the starter/generator and a second bandpass filter that may filter the rectified exciter voltage signals to generate reference signals ($\alpha,\beta$). These two signals may be processed to extract a rotor position. As noted, this particular method may utilize bandpass filters. Further, this method utilizes fairly complex mathematical calculations.

As can be seen, there is a need for an aircraft engine starter/generator not requiring bandpass filters. Further, there is a need for an aircraft engine starter/generator not requiring complex mathematical calculations.

SUMMARY OF THE INVENTION

In one aspect of the present invention, a position and speed sensing method may include supplying voltage to a stator, coupling the voltage to a rotor, extracting an envelope of the voltage using an operator, and calculating a rotor angular position based on the extracted envelope.

In another aspect of the present invention, a position and speed sensing method may include supplying a voltage to a stator, coupling the voltage to a rotor, obtaining a first quadrature-component of the voltage, obtaining a second quadrature-component of the voltage, obtaining a first energy operator of the first quadrature-component, obtaining a second energy operator of the second quadrature-component, and calculating a rotor angular position using the first energy operator and the second energy operator.

In another aspect of the present invention, a position and speed sensing apparatus may include a stator, a rotor and a controller to extract an envelope of a voltage coupled through the rotor into the stator using an operator and to calculate a rotor angular position based on the extracted envelope.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention may extract an envelope of a voltage using an operator in order to calculate a position and speed of a rotor. Embodiments may be useful in a variety of environments, including starter/generators for aerospace and industrial power and drive systems. Embodiments may provide starter/generators not requiring bandpass filters. Embodiments may provide starter/generators not requiring complex mathematical computations.

Embodiments of the present invention may differ from conventional sensorless starter/generators and methods at least by not requiring bandpass filters to obtain a position and speed of a rotor. Embodiments of the present invention may differ from conventional sensorless starter/generators and methods at least by using an energy operator of a wave to calculate a position and speed of a rotor. Embodiments of the present invention may differ from conventional sensorless starter/generators and methods at least by using envelope tracking to calculate a position and speed of a rotor.

Figure 1:
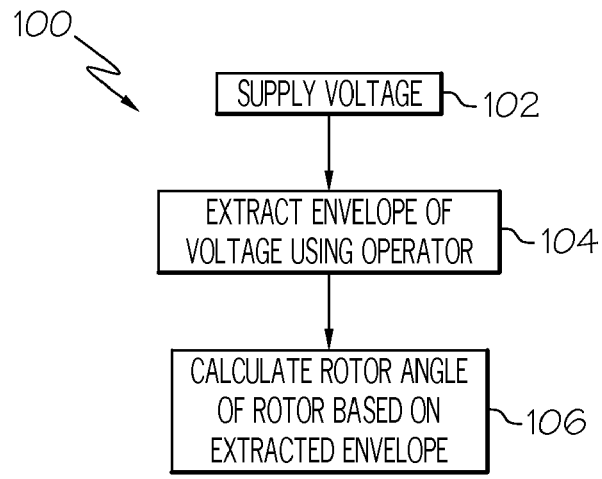
FIG. 1 is a flowchart of a method of sensing a rotor position and rotor speed according to an embodiment of the present invention.

FIG. 1 is a flowchart of a method 100 of sensing a rotor position and rotor speed according to an embodiment of the present invention. In operation 102, a voltage may be supplied to a exciter stator of a starter/generator device. The voltage may be a constant frequency voltage. Alternatively, the voltage may be a variable frequency voltage.

In operation 104, an envelope of the voltage (or signal) may be extracted using an operator. The envelope (and envelope tracking) may be understood with reference to a waveform, such as a sinusoidal waveform (which may be used in an electrical power system, motor controller, or starter/generator). For a sinusoidal waveform, a voltage/current waveform may be expressed mathematically by the signal amplitude and the signal frequency. Envelope tracking (some times called envelope detection) may be used to compute (or estimate) the signal (voltage or current) amplitude instantaneously, or within a small acceptable delay. Envelope tracking may be different from peak detection as peak detection may be based on a window of samples while envelope tracking may detect amplitude instantaneously or almost instantaneously. In an embodiment, the operator may be an energy operator. The energy operator may include energy content of the voltage (or voltage signal). In an embodiment, the extracting of the envelope of the voltage may include extracting an envelope of quadrature components of the voltage. In operation 106, a rotor angle of the rotor may be calculated based on the extracted envelope. In an embodiment, operations 104 and 106 may be carried out digitally using software.

Figure 2:
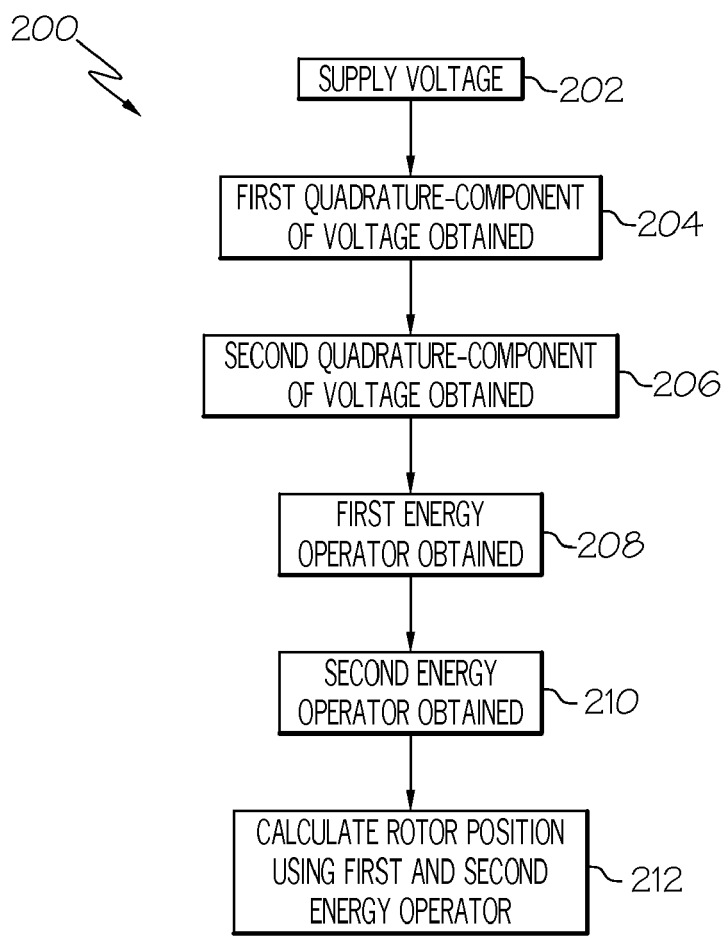
FIG. 2 is a flowchart of a method of sensing a rotor position and rotor speed according to an embodiment of the present invention.

FIG. 2 is a flowchart of a method 200 of sensing a rotor position and rotor speed according to an embodiment of the present invention. In operation 202, a voltage may be supplied to a exciter stator of a starter/generator device. A portion of that voltage may be coupled into the main stator via the exciter rotor and main rotor. An envelope of two quadrature-components of the voltage may be tracked and extracted from the voltage. In operation 204, a first quadrature-component of the voltage may be obtained, and in operation 206, a second quadrature-component of the voltage may be obtained. In an embodiment, the two quadrature components $u_\alpha(t)$ and $u_\beta(t)$ may be represented mathematically as:

$$u_\alpha(t) = [A \sin(\omega_m t)] \times \sin(\omega_c t)$$

$$u_\beta(t) = [A \cos(\omega_m t)] \times \sin(\omega_c t)$$

where A may be a constant amplitude of the signal (which may be a function of a magnetic coupling of the machine), $\omega_c$ may be a carrier frequency, and where $\omega_m$ may be a modulation frequency which may vary with motor speed. The carrier frequency may be a constant or variable frequency.

The terms $[A \sin(\omega_m t)]$ and $[A \cos(\omega_m t)]$ may vary during motor operation. Accordingly, these components may need to be estimated. These components may be used to extract rotor speed.

Energy operators of the two quadrature-components may be obtained. In operation 208, a first energy operator of the first quadrature-component may be obtained, and in operation 210, a second energy operator of the second quadrature-component may be obtained. In an embodiment, the energy operators, $E_\alpha(t)$ and $E_\beta(t)$, may be represented mathematically as:

$$E_\alpha(t) = u_\alpha(k)^2 - u_\alpha(k-1) \times u_\alpha(k+1) = [A \sin(\omega_m t)] \times \omega_c$$

$$E_\beta(t) = u_\beta(k)^2 - u_\beta(k-1) \times u_\beta(k+1) = [A \cos(\omega_m t)] \times \omega_c$$

wherein k may be an integer number equal to the number of the sample (k=1 may be equivalent to time at zero second).

In operation 212 a rotor angle θ may be calculated using the first energy operator and the second energy operator. In an embodiment, the first energy operator and the second energy operator may be expressed as a first signal amplitude and a second signal amplitude in order to calculate a rotor angle. In an embodiment, the signal amplitudes may be represented mathematically as:

$$[A \sin(\omega_m t)] = (u_\alpha(k)^2 - u_\alpha(k-1) \times u_\alpha(k+1))/\omega_c$$

$$[A \cos(\omega_m t)] = (u_\beta(k)^2 - u_\beta(k-1) \times u_\beta(k+1))/\omega_c$$

In an embodiment, operation 212 may be represented mathematically as:

$$\theta = \arctan\{(u_\alpha(k)^2 - u_\alpha(k-1) \times u_\alpha(k+1))/(u_\beta(k)^2 - u_\beta(k-1) \times u_\beta(k+1))\}$$

As can be observed by this equation, θ may not depend on the carrier frequency. Thus, this equation may be used with a variable carrier frequency which allows the use of the method of operation 212 throughout an entire operating frequency. This equation may have a minimum delay (1 sample), be stable, and be mathematically simple in that only two multiplications and one subtraction are performed for each signal.

Figure 3:
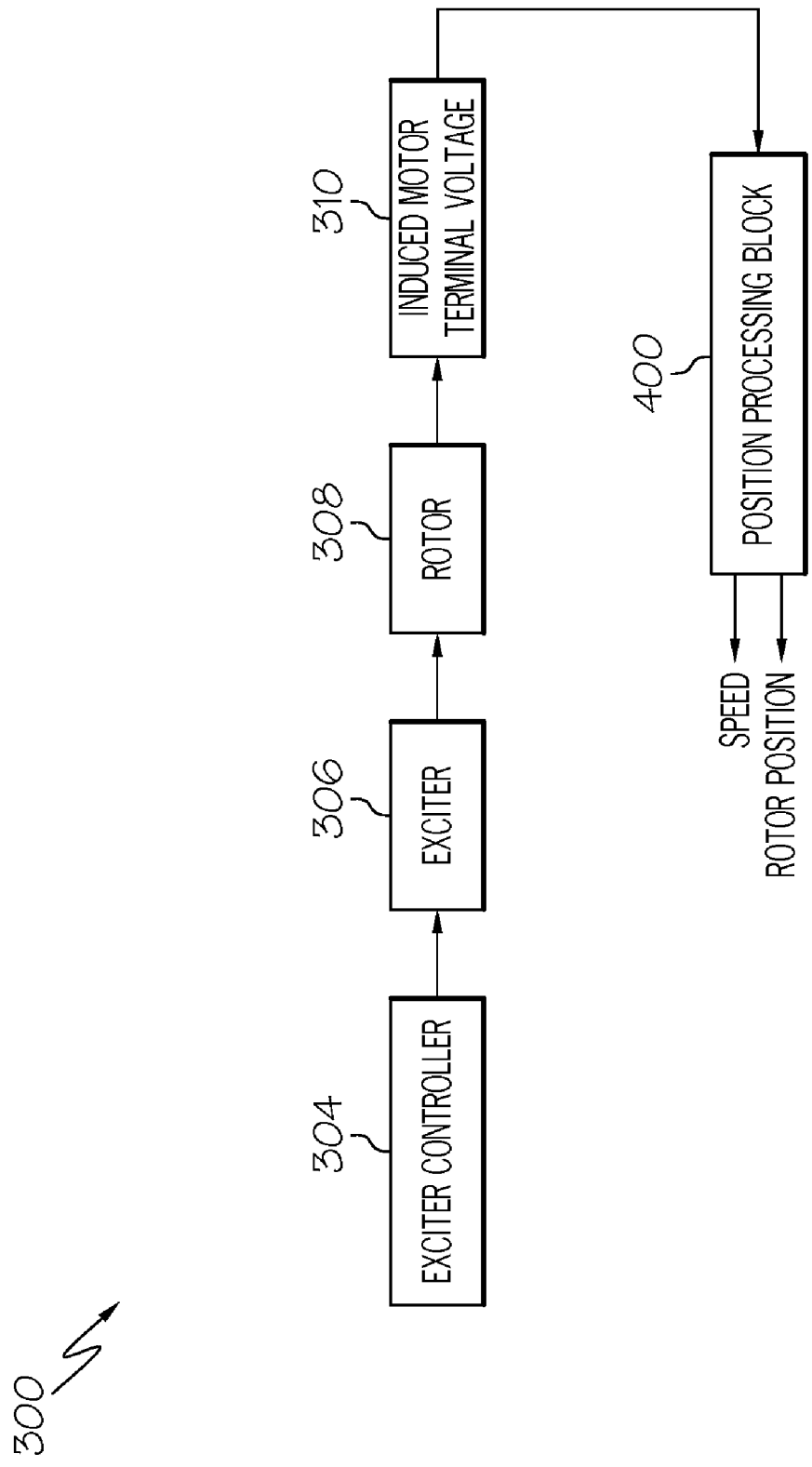
FIG. 3 is a schematic representation of a position and speed sensing apparatus according to an embodiment of the present invention.
Figure 4:
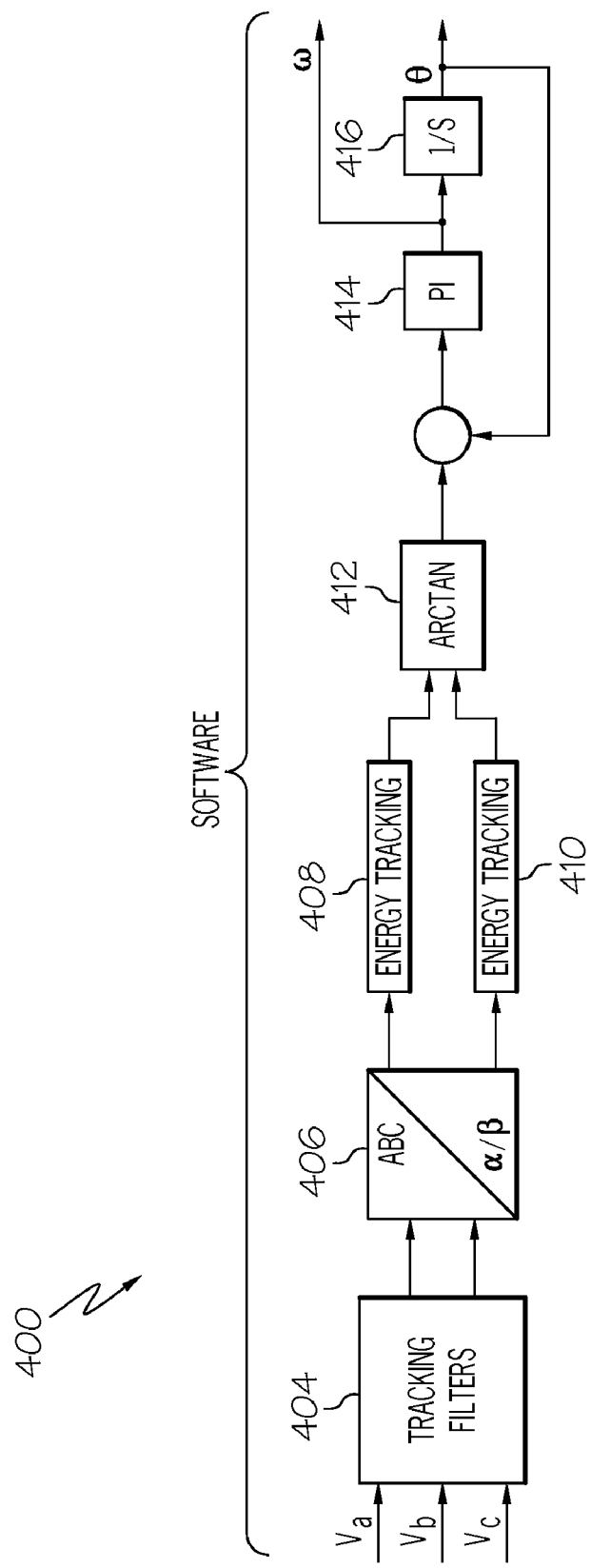
FIG. 4 is a schematic representation of a position processing block according to an embodiment of the present invention.

FIG. 3 is a schematic representation of a position and speed sensing apparatus 300 according to an embodiment of the present invention. The position and speed sensing apparatus 300 may include an exciter controller 304, an exciter 306, a rotor 308, and a position processing block 400 (FIG. 4).

The exciter controller 304 may control the voltage value and the frequency that may be supplied to the exciter 306. The exciter 306 may be coupled to the motor winding, and therefore induced voltage 310 may appear on the motor terminals. This induced voltage 310 may be manipulated by the position processing block 400 to extract the speed and the rotor position. The position processing block 400 may extract the envelope of the induced voltage 310 using an operator. The envelope of the voltage may be an envelope of quadrature components of the voltage. The operator may be an energy operator. The energy operator may comprise energy content of the voltage 310.

The energy of any signal may be given as a summation of kinetic energy and potential energy of the signal. An energy operator may be a mathematical method to compute the sum of the kinetic and potential energy of a sinusoidal waveform. As known by those of ordinary skill in the art, H. M. Teager proved that energy in a simple harmonic oscillation is proportional to squares of the amplitude and the frequency. Since the voltage signal may be a sinusoidal function (which is simple harmonic oscillation), the energy may be computed and used for estimating the signal amplitude and frequency. For motor applications, a resolver-emulator circuit may give two signals, the magnitudes of which may vary according to rotor position. By tracking the envelope of these two signals (or by tracking the changes in their amplitude), the rotor position may be detected instantaneously (or almost instantaneously). The exciter controller 304 may calculate a rotor angle of the rotor 308 based on the extracted envelope of the induced voltage 310.

In an embodiment, the controller may comprise a position processing block. FIG. 4 is a schematic representation of a position processing block 400 according to an embodiment of the present invention. The position processing block 400 may include tracking filters 404, a quadrature-component part 406, energy trackers 408, 410, a calculator 412, a PI controller 414, and an integrator 416. A voltage signal sensed at a motor terminal, such as the induced voltage 310, may be composed of two signals: the fundamental frequency signal; and the resolver-emulator signal. Tracking filters 404 may separate resolver-emulator signals from the fundamental frequency signal. The quadrature-component part 406 may perform a traditional three-phase component to quadrature component conversion according to the following equation:

$$\begin{pmatrix} u_\alpha \\ u_\beta \end{pmatrix} = \begin{pmatrix} \dfrac{2u_{ab} - u_{bc} - u_{ca}}{3} \\ \dfrac{u_{ca} - u_{bc}}{\sqrt{3}} \end{pmatrix}$$

Energy trackers 408, 410 may track rotor position. The output of the energy trackers 408, 410 may be two quadrature demodulated signals. The calculator 412 may be an inverse tangent (arctan) function that determines the rotor position. The proportional-integration (PI) controller 414 may act as phase-locked loop. The PI controller 414 may be used to estimate rotor speed. The integrator 416 may be used to integrate the speed to close the loop of the phase-locked loop.

Figure 5:
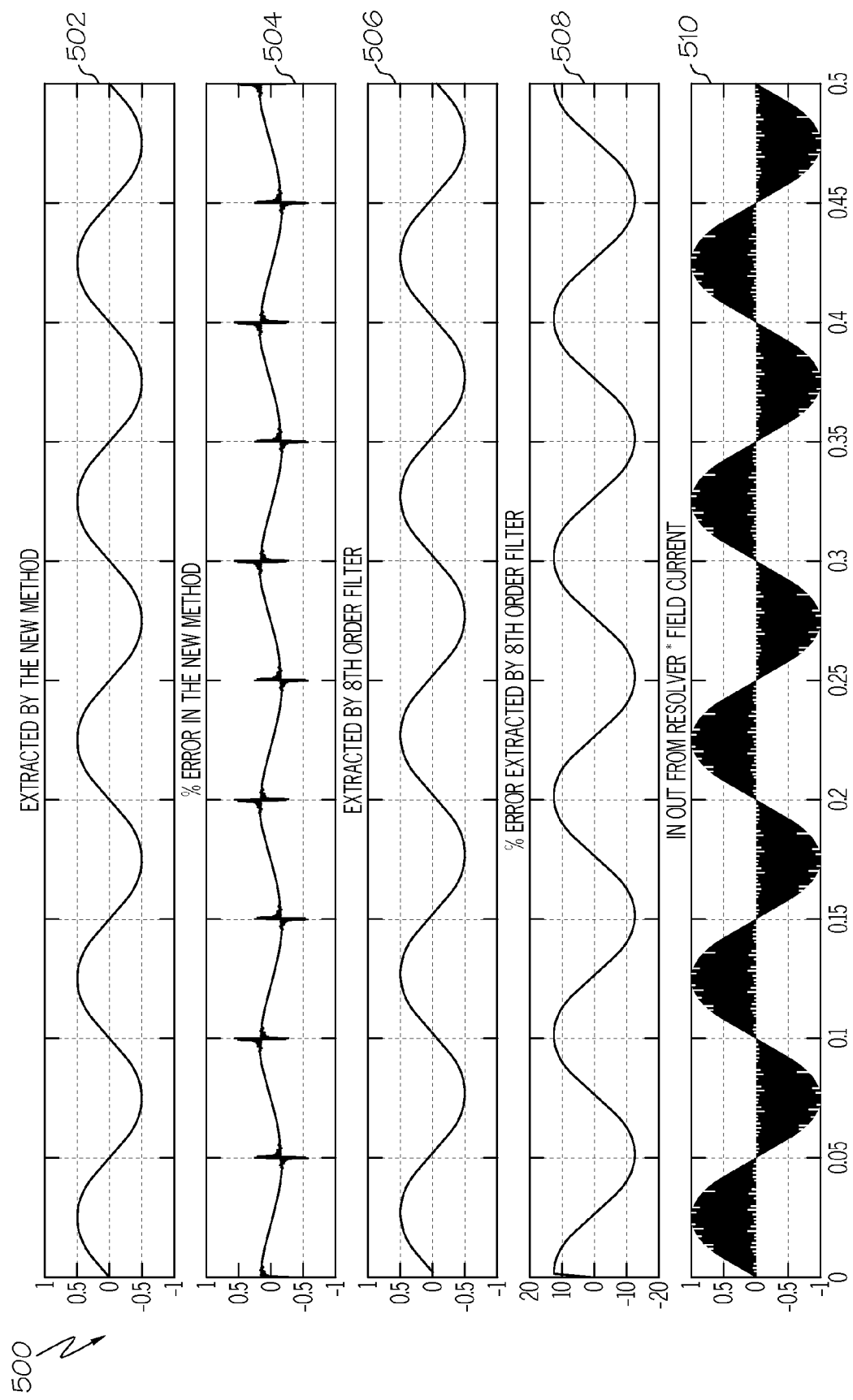
FIG. 5 is a screenshot of simulated waveforms illustrating a component extracted according to an embodiment of the present invention relative to a component extracted according to a conventional method.

FIG. 5 is a screenshot 500 of simulated waveforms illustrating a component extracted according to an embodiment of the present invention relative to a component extracted according to a conventional method. The top waveform 502 shows the component extracted using an energy operator. The second (from the top of the page) waveform 504 shows an error percentage of the component extraction. The third waveform 506 shows the component extracted using a conventional method. The fourth waveform 508 shows an error percentage of the component extraction. The bottom signal 510 shows one of two quadrature signals that may be output, for example, from the quadrature-component part 406 of FIG. 4. This signal 510 may be modulated by a rotor position signal. By processing the signal 510 by, for example, one of the energy trackers 408, 410 of FIG. 4, a demodulated rotor position signal, such as the top waveform 502, may be output. Because there may be a delay in the tracking process, there may be an error between the actual envelope and the envelope tracked, for example, by one of the energy trackers. This percentage rate is shown in second waveform 504. In an embodiment, the error percentage may be less than 0.5% and may be independent of the rotor speed and the modulation frequency. If the energy trackers 408, 410 are replaced by an 8$^{th}$ order Butterworth filter, a demodulated output signal, such as the third waveform 506, may be output. The delay between the actual envelope and the envelope tracked by the Butterworth Filter may be larger. Due to this delay, the error rate may be larger as shown, for example, in the fourth waveform 508.

Figure 6:
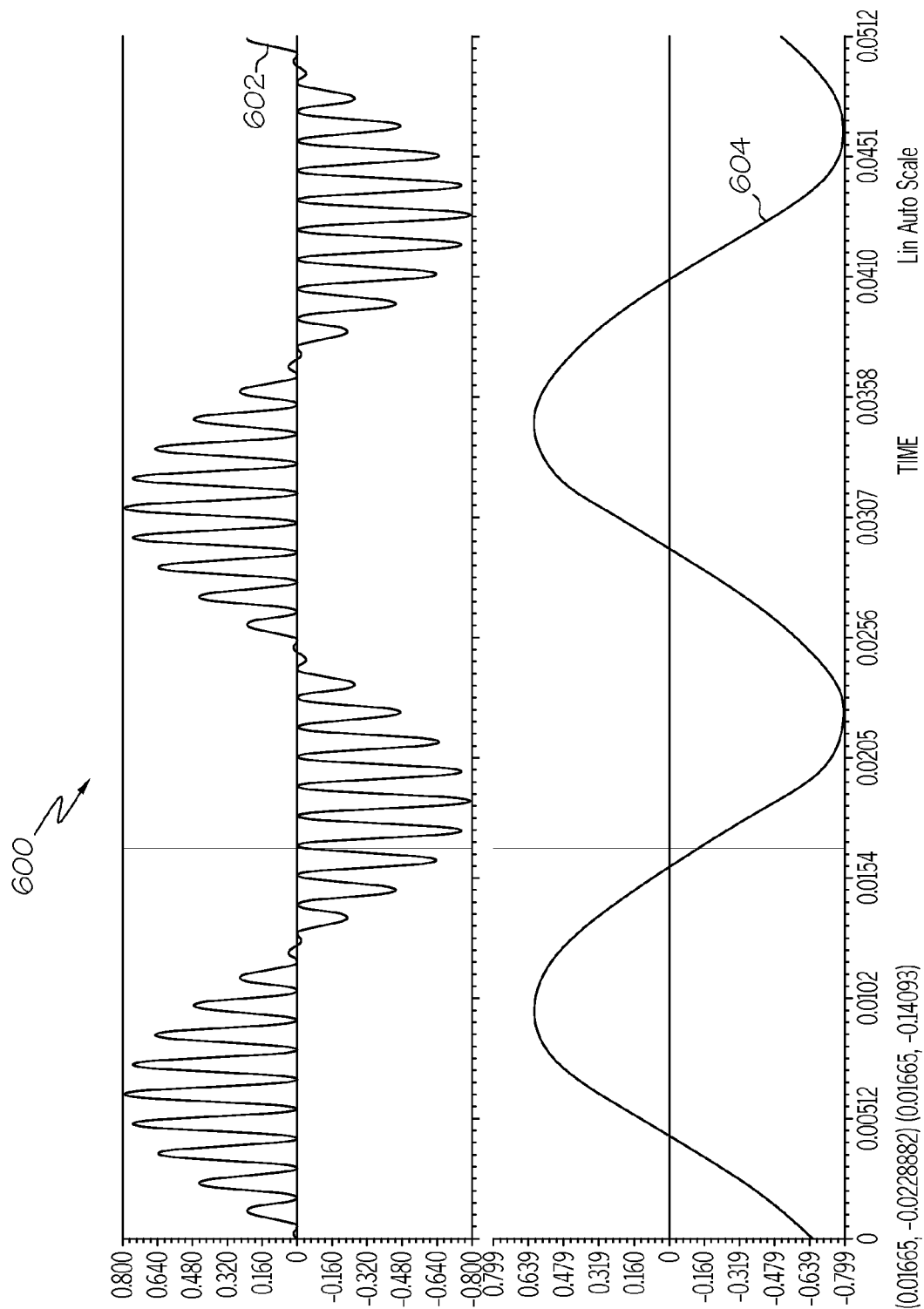
FIG. 6 is a screenshot of waveforms illustrating demodulation according to a conventional method relative to an actual sinusoidal modulation signal as implemented on a digital signal processor.

FIG. 6 is a screenshot 600 of waveforms illustrating demodulation according to a conventional method relative to an actual sinusoidal modulation signal as implemented on a digital signal processor. The top waveform 602 shows the actual modulated sinusoidal waveform while the bottom waveform 604 shows a signal demodulated according to the conventional method (using 8$^{th}$ order Butterworth filter). The signal demodulated according to the conventional method is delayed approximately 7-8 milliseconds relative to the actual sinusoidal waveform. As discussed below with respect to an exemplary embodiment of the present invention, a signal demodulated according to an embodiment of the present invention may only be delayed by approximately 25 microseconds.

Figure 7:
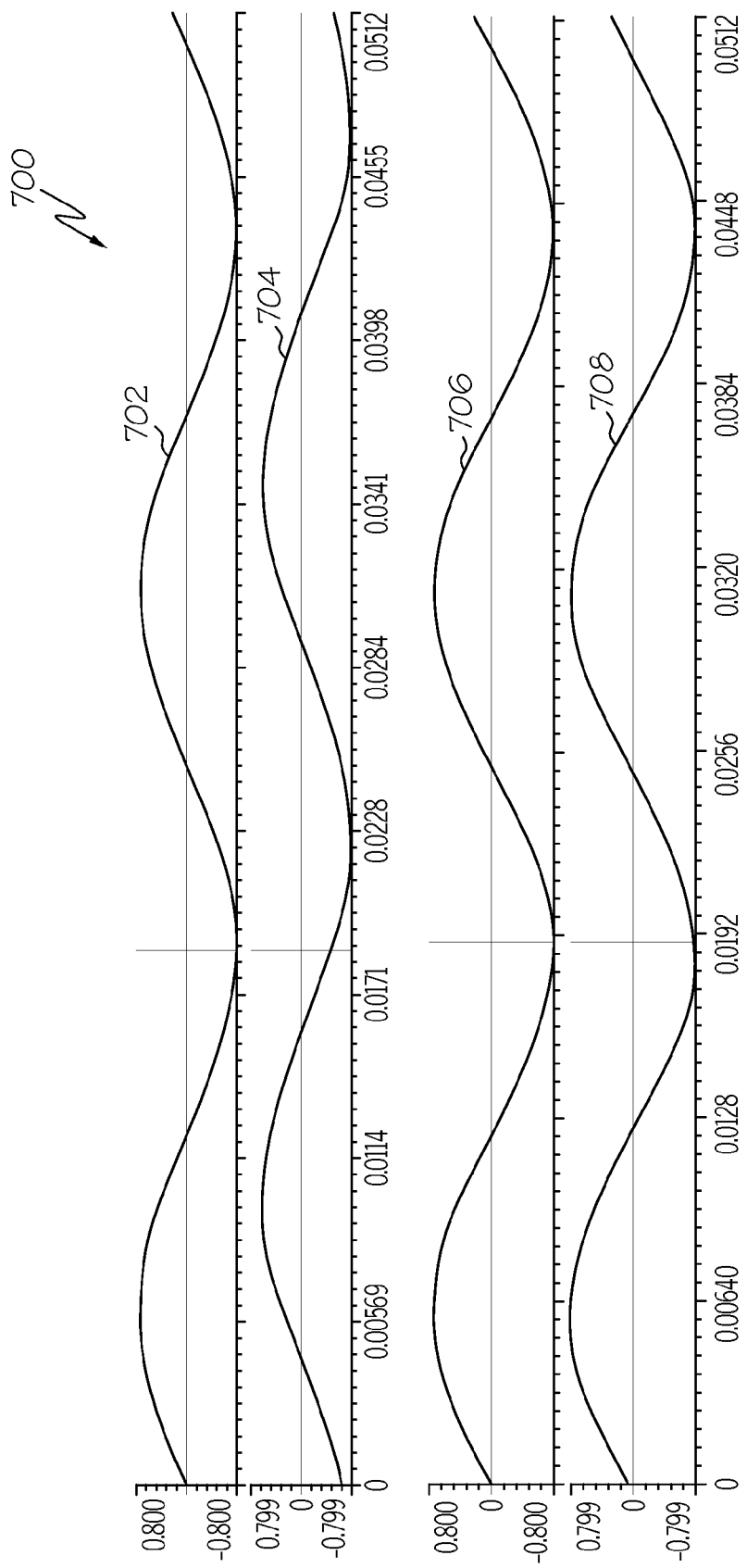
FIG. 7 is a screenshot of waveforms illustrating a demodulation signal extracted according to an embodiment of the present invention relative to a demodulation signal extracted according to a conventional method.

FIG. 7 is a screenshot 700 of waveforms illustrating a demodulation signal extracted according to an embodiment of the present invention relative to a demodulation signal extracted according to a conventional method. The top and third (from top) waveforms 702, 706 show actual sinusoidal waveforms. The second waveform 704 shows a signal demodulated by an 8$^{th}$ order Butterworth low pass filter. The fourth waveform 708 shows a signal demodulated according to an embodiment of the present invention. The signal demodulated by an 8$^{th}$ order Butterworth low pass filter is delayed by approximately 7-8 milliseconds relative to the actual sinusoidal waveform. The signal demodulated according to an embodiment of the present invention is delayed only by approximately 25 microseconds.

It should be understood, of course, that the foregoing relates to exemplary embodiments of the invention and that modifications may be made without departing from the spirit and scope of the invention as set forth in the following claims.

We claim:

1. A sensing method, comprising:
   supplying voltage to a stator;
   coupling the voltage to a rotor;
   extracting an envelope of the voltage using an operator, wherein the extracting of the envelope of the voltage using the operator comprises obtaining a first quadrature-component of the voltage, obtaining a second quadrature-component of the voltage, obtaining a first energy operator of the first quadrature-component, and obtaining a second energy operator of the second quadrature-component; and
   calculating a rotor angular position based on the first energy operator and the second energy operator.

2. The method of claim 1, wherein the voltage is a constant frequency voltage.

3. The method of claim 1, wherein the voltage is a variable frequency voltage.

4. The method of claim 1, wherein the energy operator comprises energy content of the voltage.

5. The method of claim 1, wherein the extracting of the envelope of the voltage comprises extracting an envelope of quadrature components of the voltage.

6. The method of claim 1, wherein the extracting and the calculating are carried out digitally using software.

7. A sensing method, comprising:
   supplying a voltage to a stator;
   coupling the voltage to a rotor;
   obtaining a first quadrature-component of the voltage;
   obtaining a second quadrature-component of the voltage;
   obtaining a first energy operator of the first quadrature-component;
   obtaining a second energy operator of the second quadrature-component; and
   calculating a rotor angular position using the first energy operator and the second energy operator.

8. The method of claim 7, wherein the voltage is a constant frequency voltage.

9. The method of claim 7, wherein the voltage is a variable frequency voltage.

10. The method of claim 7, wherein the first energy operator is expressed as a first signal amplitude and the second energy operator is expressed as a second signal amplitude.

11. The method of claim 10, wherein the first signal amplitude $[A \sin(\omega_m t)]$ and the second signal amplitude $[A \cos(\omega_m t)]$ are represented mathematically as $$[A \sin(\omega_m t)] = (u_\alpha(k)^2 - u_\alpha(k-1) \times u_\alpha(k+1))/\omega_c$$

$$[A \cos(\omega_m t)] = (u_\beta(k)^2 - u_\beta(k-1) \times u_\beta(k+1))/\omega_c$$

and wherein the calculating a rotor angular position $\theta$ using the first energy operator and the second energy operator is represented mathematically as $$\theta = \arctan\{(u_\alpha(k)^2 - u_\alpha(k-1) \times u_\alpha(k+1))/(u_\beta(k)^2 - u_\beta(k-1) \times u_\beta(k+1))\}.$$

12. A sensing apparatus, comprising:
a stator;
a rotor; and
a controller to extract an envelope of a voltage coupled through the rotor into the stator using an operator, wherein the envelope of the voltage is an envelope of quadrature components of the voltage, wherein the quadrature components include a first quadrature-component of the voltage having a first energy operator and a second quadrature-component of the voltage having a second energy operator, wherein the controller calculates a rotor angular position based on the first energy operator and the second energy operator.

13. The apparatus of claim 12, wherein the voltage is a constant frequency voltage.

14. The apparatus of claim 12, wherein the voltage is a variable frequency voltage.

15. The apparatus of claim 12, wherein the operator is an energy operator.

16. The apparatus of claim 15, wherein the energy operator comprises energy content of the voltage.

17. The apparatus of claim 12, wherein the controller comprises software instructions to extract the envelope of the voltage supplied to the stator, coupling a portion of the voltage to the rotor and from there to the stator, using the operator and to calculate the rotor angular position based on the extracted envelope.

* * * * *